United States Patent
Coons (10) Patent No.: US 9,623,782 B1
(45) Date of Patent: Apr. 18, 2017

(54) MOBILE ENVIRONMENTAL ANALYSIS LAB AND METHOD TO EXPEDITE TEST RESULTS

(71) Applicant: William Coons, Albuquerque, NM (US)

(72) Inventor: William Coons, Albuquerque, NM (US)

(73) Assignee: Mobile Environmental Determinations, USA, L.L.C., San Diego, CA (US)

( * ) Notice: Subject to any disclaimer, the term of this patent is extended or adjusted under 35 U.S.C. 154(b) by 0 days.

(21) Appl. No.: 14/709,265

(22) Filed: May 11, 2015

Related U.S. Application Data (60) Provisional application No. 61/990,882, filed on May 9, 2014.

(51) Int. Cl.
*B60P 3/00* (2006.01)
*B60P 3/14* (2006.01)

(52) U.S. Cl.
CPC ................. *B60P 3/005* (2013.01); *B60P 3/14* (2013.01)

(58) Field of Classification Search
CPC .................................. B60P 3/005; B60P 3/14
USPC ................. 296/24.32, 24.38, 24.3; 454/187; 422/291
See application file for complete search history.

(56) References Cited

U.S. PATENT DOCUMENTS

| | | | | |
|---|---|---|---|---|
| 4,858,256 A | * | 8/1989 | Shankman | G21F 9/00 296/19 |
| 5,398,986 A | * | 3/1995 | Koob | B60P 3/14 296/24.38 |
| 7,985,382 B1 | * | 7/2011 | Henry | B01L 9/54 422/28 |
| 2010/0041094 A1 | * | 2/2010 | Sukumar | B60P 3/14 435/40.52 |
| 2010/0304658 A1 | * | 12/2010 | Grcevic | B60P 3/005 454/187 |

* cited by examiner

*Primary Examiner* — Jason S Morrow
(74) *Attorney, Agent, or Firm* — Deborah A. Peacock; Isaac Estrada; Peacock Myers, P.C.

(57) ABSTRACT

A fully equipped mobile laboratory, processes and methods for producing rapid, on-site determinations and reports documenting the presence/absence and quantity of environmentally hazardous materials common to construction or other projects in accordance with regulatory requirements.

16 Claims, 7 Drawing Sheets

MOBILE ENVIRONMENTAL ANALYSIS LAB AND METHOD TO EXPEDITE TEST RESULTS

CROSS-REFERENCE TO RELATED APPLICATIONS

This application claims priority to and the benefit of the filing of U.S. Provisional Patent Application Ser. No. 61/990,882, entitled "MOBILE ENVIRONMENTAL ANALYSIS LAB AND METHOD TO EXPEDITE TEST RESULTS", filed on May 9, 2014, and the specification and claims thereof are incorporated herein by reference.

BACKGROUND OF THE INVENTION

Field of the Invention (Technical Field)

The present invention relates to environmental assessments, and more particularly to equipment, processes and methods to expedite test results.

Background Art

Repair and demolition activities of commercial and residential structures require that workers not be unknowingly exposed to environments that are hazardous to human health. Delays are incurred by the need to sample and analyze the materials that workers will be sawing, abrading, cutting, tearing down, or otherwise removing. Once knowledge of the materials is established as hazardous or non-hazardous, then appropriate safety measures can be adopted and repair and demolition activities can proceed without hazardous exposures to workers, observers, or the environment. The time necessary for sampling the material, getting the material to a conventional, certified laboratory, and obtaining a signed, written report that allows the repair or demolition to proceed customarily requires from 2 days to 5 or more days. This delay increases project time and costs. Thus, there is a need for equipment, processes and methods for expediting such environmental testing at such sites or other projects.

Embodiments of the present application comprise equipment, processes and methods for producing rapid, on-site determinations and reports documenting the presence/absence and quantity of environmentally hazardous materials common to construction projects in accordance with all of the technical analytical and quality control requirements of USEPA and national laboratory accrediting agencies such as the National Voluntary Laboratory Accreditation Program (NVLAP) and the American Industrial Hygiene Association (AIHA).

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Conventional laboratories employ a laborious process. First, an administrative person ("admin") located in a receiving area accepts/rejects samples brought by the customer and confirms by signature (or entirely fills out) a Chain-Of-Custody (COC) form. The admin then logs the samples documented on the COC into the laboratory's paperwork system. Next, the admin delivers the sample and COC to an analyst, who signs the COC to denote custody of the sample. This may occur within minutes of the sample being transported to the laboratory or after hours or days of delay.

The analyst then prepares the samples for analysis and observes the characteristics of the sample using a Polarized Light Microscope (PLM). In order to comply with USEPA analytical requirements, the analyst must follow EPA/600/R-93/116. The analyst customarily completes a paper form that documents his/her observations. That form is delivered to an admin for assimilation and conversion into a draft report. It is not unusual for production of a draft report to require more than a day and a half. Once the draft report is completed, it is returned to the analyst, who must then compare and edit/approve the draft report and return the edited/approved draft to the admin. A final report is then produced for signature, and the result is mailed to the customer. Commonly, a representative of the laboratory will call the customer and tell the customer the results over the phone, but the customer is usually warned that verbal results are not supposed to be relied on. The total time from receipt of sample to receipt of a written report is generally around 3-5 days, or longer.

Figure 1:
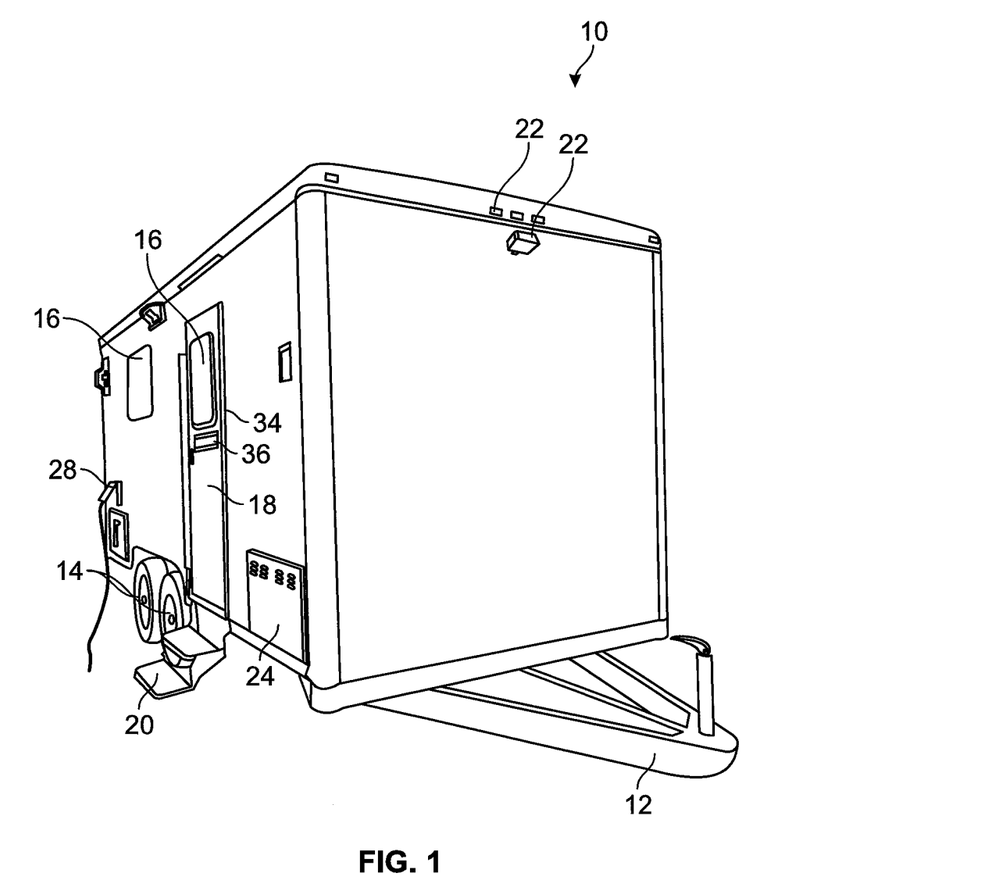
FIG. 1 is a perspective front view illustration of an embodiment of a mobile lab.

Embodiments of the present invention perform reliable analyses at remote sites. Embodiments of the present invention comprise roadworthy mobile laboratories. One embodiment of the present invention comprises a laboratory that mobilizes and is secured at or very near to the site of concern. This mobility eliminates the time required to place samples into the possession of analysts, which saves from hours to days of time incurred by conventional laboratories. A mobile laboratory is preferably built such that it can be towed such as mobile laboratory 10 as shown in FIG. 1. Optionally, a mobile lab can be built to run independently like an RV. Preferably, mobile laboratory 10 is solidly constructed and insulated, and is physically inspected and approved as meeting the operational standards required by federal (NVLAP) and State of California inspectors (ELAP). In one embodiment, mobile laboratory 10 also meets all of the operational and safety requirements for travel on roads and highways. In one embodiment, mobile laboratory 10 comprises hitch 12, wheels 14, one or more windows 16, one or more doors 18, outside steps 20, and one or more lights 22. Preferably, mobile laboratory 10 comprises running water, electricity, climate controls for heating and cooling, and communication capability.

In one embodiment, mobile laboratory 10 accomplishes real-time results by eliminating the round trip travel time between the customer's work site and the laboratory, and by replacing the conventional trail of paperwork with unique software (discussed in more detail below) that integrates the regulatory requirements for documenting observations with report preparation and delivery of results to the customer. Preferably, results are reported to the customer between approximately 1.0 hrs. and approximately 10 hrs., more preferably between 0.75 hrs. and approximately 6 hrs., and most preferably between approximately 0.2 hrs. and 4.5 hrs.

Laboratories require electrical power. A mobile laboratory is a special case where redundant power sources are a requirement. In many cases, a user of an embodiment of the present invention will not know if external sources of power will be available at the sampling location. Moreover, the length of time that the mobile laboratory will remain at the site is also unknown. Accordingly, mobile laboratory 10 is preferably equipped to operate using: 1) a direct source of onsite electric power (e.g., an AC land-line source connected via an extension cord); 2) battery power (e.g., the mobile laboratory embodiment contains an AC-DC inverter that allows batteries to power the equipment, and an external AC source, for example 110 volt plug-in 28, to recharge the batteries); 3) a diesel and/or a gasoline generator of suitable power, and/or 4) a solar power station that converts solar energy to electricity. In one embodiment, batteries are stored, for example, in compartment 24. In one embodiment, inverter 26 (not shown) allows recharging the batteries.

Figure 2A:
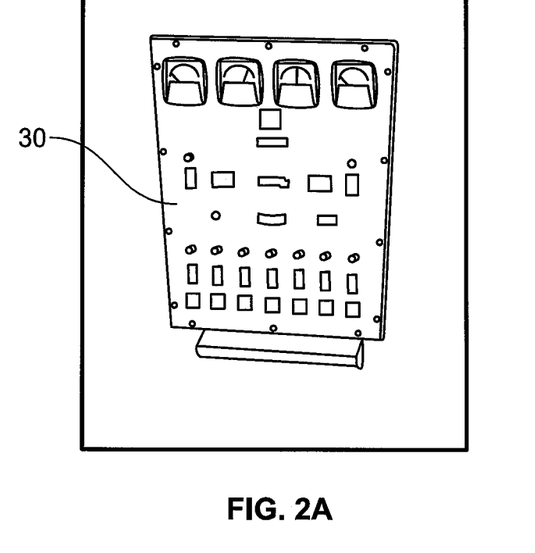
FIG. 2A is an illustration of an embodiment of a power distribution center for the embodiment of FIG. 1.

Referring to FIG. 2A, in one embodiment, the electrical systems in mobile laboratory 10 are controlled by internally wired distribution system 30 that allows the power to be switched from source to source, and for the non-battery sources to recharge the batteries.

In one embodiment, the mobile laboratory environment is preferably at least as contaminant free as common fixed-base laboratories. Standard operating procedures (SOPs) for a mobile laboratory embodiment are preferably based on fixed-base laboratory requirements, but are more stringent because the mobile laboratory embodiment contains a much smaller volume of internal air than a normal fixed-base lab.

Preferably, customers are not allowed to enter mobile laboratory 10. Persons who have been in an environment where asbestos work is contemplated may be carrying asbestos fibers on their clothes, or in the hair, etc. Preferably, the SOPs of the mobile laboratory embodiment require that its personnel intercept customers and receive their COCs and samples outside the mobile laboratory.

Figure 2B:
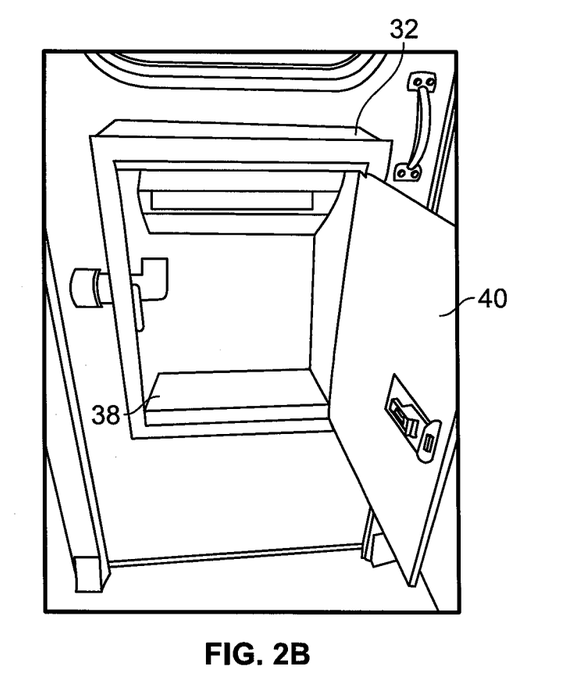
FIG. 2B is an illustration of an embodiment of an air lock system on the inside of the receiving door of FIG. 3C in the opened configuration.

Referring to FIG. 2B, preferably samples are transferred from a customer to the mobile laboratory through sample delivery airlock 32 that is connected to external receiving unit 34. In one embodiment, external receiving unit comprises slot 36. Sample delivery airlock 32 preferably allows a customer to place a COC with samples in, for example, a resealable (e.g. Ziploc) bag, and then seal and place that bag into compartment 38 of sample delivery airlock 32. A vacuum pump (not shown) is preferably activated to extract approximately 5 times the volume of air contained in compartment 38, and preferably filters the exhaust air through an HEPA particulate filter (not shown). The filter preferably removes any asbestos fibers that might have escaped onto the resealable bag during the sample transfer. After the approximately 5 volumes of air have been pumped (preferably in about 3 minutes), interior door 40 of the airlock is opened by an analyst, and the sample resealable bag is preferably retrieved and placed in an operating hood. The samples are then optionally retrieved and prepared for mounting.

Figure 3A:
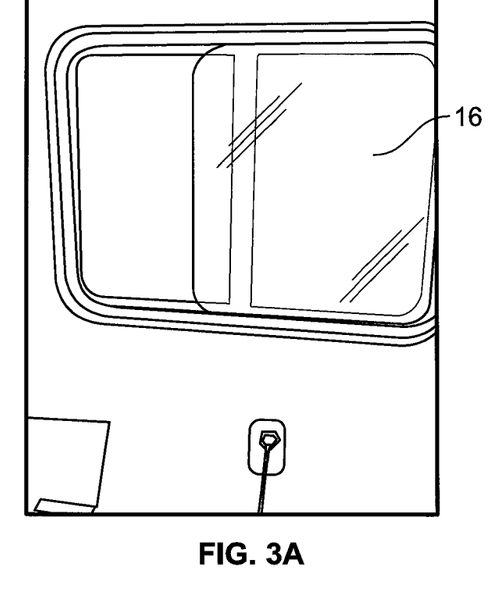
FIG. 3A is an illustration of an operable window of the embodiment of FIG. 1.
Figure 3B:
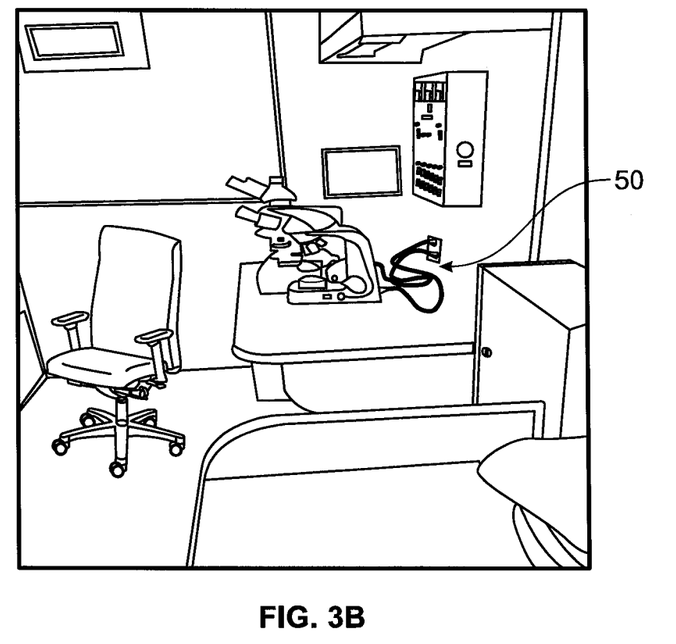
FIG. 3B is an illustration showing an embodiment of a working station for the front end of the embodiment of FIG. 1.
Figure 3C:
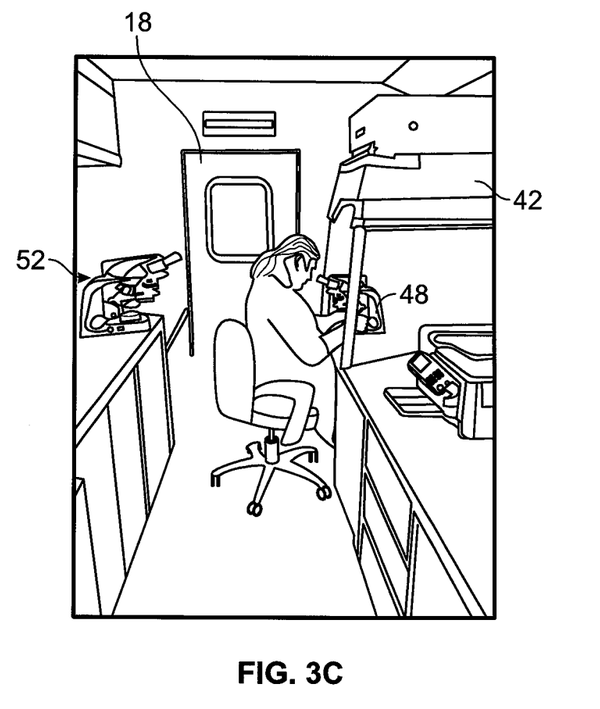
FIG. 3C is an illustration showing an embodiment of a working station for the rear end of the embodiment of FIG. 1.
Figure 3D:
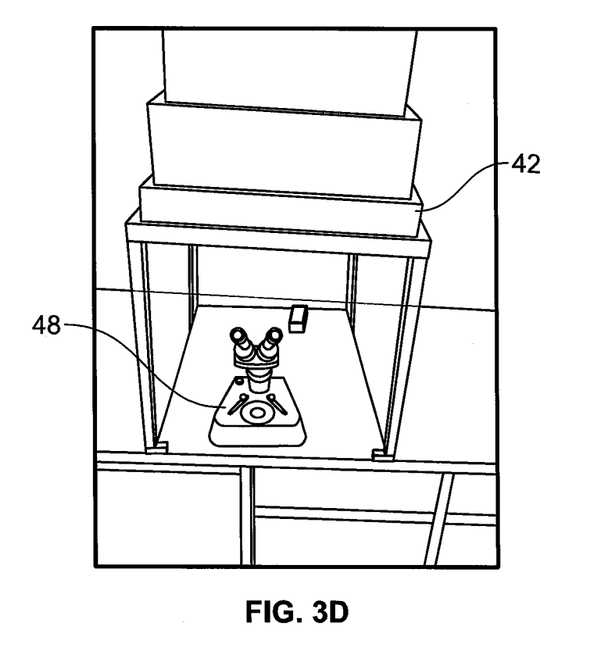
FIG. 3D is an illustration showing a microscope in an operating hood for analyses in the embodiment of FIG. 1.

The concern most frequently mentioned by inspecting regulators is the potential for contamination of the internal environment by the asbestos materials brought into a laboratory as samples for analysis, or by chemicals used to produce samples acceptable for mounting and analysis. In one embodiment, the SOPs of a mobile laboratory preferably address these concerns directly. Preferably, the SOPs comprise periodic purging of internal air using one or more filtered operating hood 42 (dust particles and fumes), as well as purging when necessary due to suspected air contamination. The air extraction rate preferably allows for replacement of the entire volume of internal air in less than 5 minutes. Similarly, a daily routine preferably requires an initial air purge to set a baseline for confidence, and a second purge is preferably scheduled for mid-day.

Asbestos-containing samples are routinely ground into powders as part of the sample mounting process. If not properly contained, these powders can become airborne and contaminate the internal air. Preferably, the SOPs of the mobile laboratory embodiment require all sample preparation to be conducted within one or more operating hood 42. The airflow velocity of the hood is preferably verified daily and recorded to assure the safety of the internal air environment. Excess sample materials are preferably returned to resealable bags, secured, and maintained within the hood throughout the day. At the end of the day, the excess samples are preferably stored in a fixed-base lab for at least 30 days, prior to disposal in an approved landfill.

Figure 2C:
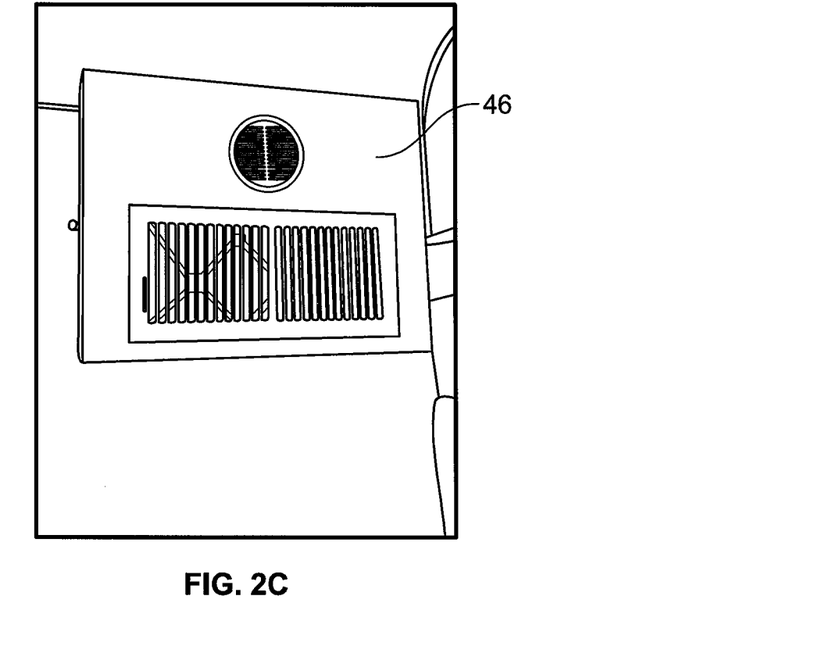
FIG. 2C is an illustration of a ventilator comprising HEPA filters for the embodiment of FIG. 1.

One or more operating hoods 42 in mobile laboratory 10 comprise an internally exhausted HEPA filtered arrangement. The need for fresh air is accommodated by acquiring replacement air through ventilator 46 that contains HEPA filters for particles and carbon filters for organic vapors.

Figure 2D:
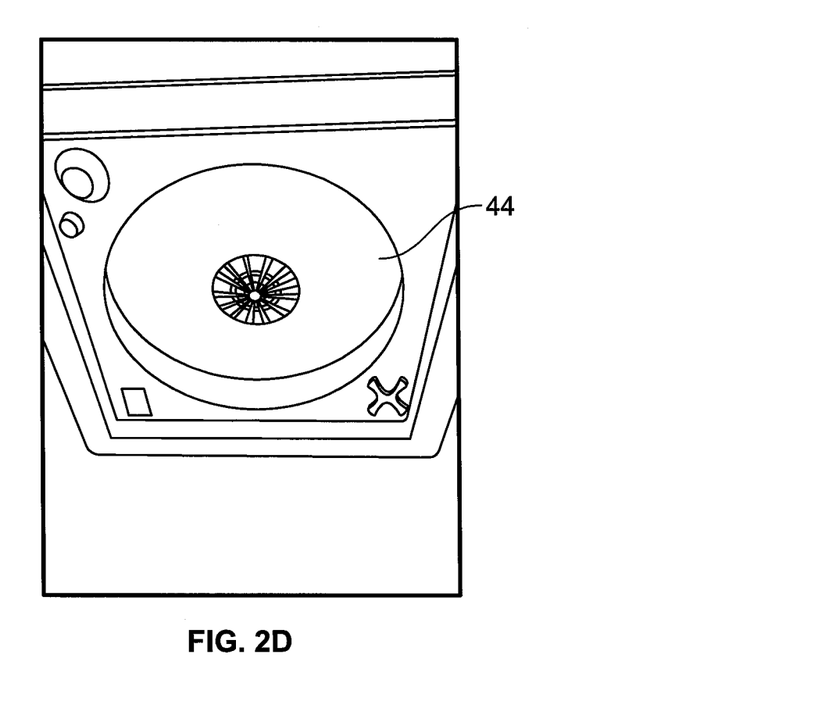
FIG. 2D is an illustration of an embodiment of a ceiling fan exhaust for the embodiment of FIG. 1.

Some samples may require exposure to solvents or heat or both in order to observe asbestos fibers. To address concerns related to potential vapors, fumes, etc., in one embodiment, mobile laboratory 10 is equipped with high volume ceiling fan 44, which can be used for rapid ventilation. In one embodiment, mobile lab 10 further comprises one or more operable windows 16.

Preferably, internal air quality is determined by conducting an airborne fiber count at the start of the day, and then on an as-needed basis. During heavy analytical workloads, a second (e.g., afternoon) internal air quality check is optionally implemented. The need for an additional air quality determination is indicated if an incident happens during a normal work-day, e.g., samples spilled outside an operating hood, appearance of an unknown odor, appearance of asbestos during an instrument check or immersion oil check, etc.

Preferably immersion oils are used in mobile laboratory 10 as required by NISTIR 88-3879 for making microscope determinations on asbestos, (EPA/600R-93/116) and airborne fibers (NIOSH 7400). Some of these oils are considered hazardous substances, so working supplies of immersion oils are preferably stored in designated areas of the mobile laboratory embodiment. Microscope preparations of asbestos samples are conducted with microscope 48 in operating hood 42.

The efficiency and accuracy of optical microscope determinations is compromised when the microscope is physically vibrating. Examples of when disruptive vibration occurs are when: 1) there is significant traffic on the same pavement (or nearby ground); 2) when operating on generator-produced power, and 3) when the mobile laboratory is unbalanced due to load or topography and an analyst walks on the laboratory floor. To address these situations, mobile laboratory 10 is preferably equipped with continuously adjustable manual and/or hydraulic stabilizers. The stabilizers are preferably located strategically on the undercarriage of the mobile laboratory according to the physical dimensions of the mobile laboratory and its load distribution.

In one embodiment mobile laboratory 10 preferably comprises two independent work stations. Each work station is preferably outfitted to inspect, prepare, mount and analyze samples. In one embodiment, work station 50 is located in the front of mobile laboratory 10. In one embodiment, work station 52 is disposed in the rear end of mobile laboratory 10. Preferably, each station is outfitted with all the equipment necessary for creating and evaluating the mounted sample slides required by USEPA for asbestos mineral detection and airborne fiber counting.

Examples of materials of concern that are addressed by embodiments of the present invention comprise materials listed as hazardous under: 1) the Resource Conservation and Recovery Act (RCRA) such as lead, cadmium and other toxic metals; and 2) the Toxic Substances Control Act (TSCA) such as asbestos and PCBs.

In addition to asbestos, the mobile laboratory is preferably equipped to sample and test for lead and mold. The presence and concentration of lead in paint and in various construction materials, dust and soil is determined using a Field Portable X-Ray Fluorescence unit (XRF). Protocols identified in Method SWA 846 are preferably followed, and technicians using the XRF units are preferably certified in the safe and technically proficient sampling and analytical methods preferably by independent entities qualified to provide such certifications. Preferably, background and sample data are entered digitally into, for example, MobiLabs' proprietary software (discussed in more detail below), which preferably converts the raw data to metal concentrations, reported in parts per million. The processed data are preferably integrated into an analytical report that can be printed, sent electronically to customers, and/or stored in MobiLabs' database. The analytical report preferably identifies the building material (e.g. paint, putty, patching materials, sealants, etc.) and location (e.g., kitchen wall, roof, living room windows, etc.) where analytical samples were taken, and preferably highlights any lead or other metal exceedances.

Preferably, the mobile laboratory and field personnel are qualified and equipped to determine the presence, concentration and Species (or Group) of mold that might be present on the surfaces of building materials. Sampling is preferably conducted by trained technicians, and ranges from direct sampling of mold on affected surfaces, to sampling of air before and after a mold investigation or mold abatement.

Sampling techniques preferably range from direct sampling using specialty tapes or swabs, to capture surface exposed spores. For example, air-o-cell sampling is preferably conducted by using an air sampling vacuum pump to force ambient air through a spore trap that removes mold spores, pollen, etc., and preferably captures them on a glass sampling slide. In some instances, air sampling is conducted close to an affected surface, whose air has been isolated from exchange with other locations of the building. Isolation may require sealing off doorways, vents, drop ceilings and all other openings that might allow air in the affected area to communicate with other air in the building or structure. Such sampling is preferably also conducted at locations near, but outside the containment area, in order to compare mold content within a suspected affected area to spore concentrations where the mold is not visibly present (potentially unaffected area sample), and to spore contents of air outside the building being sampled (i.e. local background sample).

After five or ten minutes of air sampling at a fixed sampling rate (e.g., 15 liters/minute), the sampling slide is preferably removed from the spore trap and placed sample-side-up on a base slide. The sample slide is preferably affixed to the base slide by applying an adhesive to multiple corners of the sample slide. After affixing the sample slide, staining of the sample may occur, and the sample slide is preferably turned over to a technician who has preferably been trained in the use of a Phase Contrast Microscope (PCM) to identify, for example, the Group, Genus, and Species of various spores. The analyst then completes qualitative and quantitative analyses of the spores on the slide.

In a different embodiment, when the qualified analyst is not available at the site of the mobile laboratory, analysis of the sample slide is conducted by an analyst at a central office. This analytical process utilizes, for example, digital transmission of video images from the field location of the mobile laboratory to computers in the fixed-base office. In such a circumstance, the qualified analyst (technician or Certified Industrial Hygienist ("CIH")) at the central office preferably documents the qualitative/quantitative analysis by viewing a live field transmission and/or recording of the digital video of the various spores observed on the slide. The video record is preferably then placed in the analytical database. The analyst then preferably forwards the data report to the on-call CIH, wherein the CIH preferably determines whether or not the data indicate the need for additional mold abatement in a formal report. Preferably, once the CIH has completed that step, signed, finalized and archived the analytical report, the final report to the customer is preferably released.

Areas of regulatory concern that are addressed by embodiments of the present invention include:

a. Demonstrating control of internal air quality that assures no contamination of sample materials by remnants of previous samples, or by handling during receipt of samples from couriers that originate or may have been exposed to contamination at a customer's work site;

b. Reliability of the function of the mobile laboratory's power system that is needed to perform quality analyses at remote locations, while maintaining a comfortable and safe working environment;

c. Demonstrating ability to mobilize to a site, establish a safe, secure and physically stable environment that allows analysts to complete accurate analyses with highly precise optical instruments that are sensitive to vibration and minor physical movements;

d. The ability to utilize the internet, digital technology and an embodiment of a process disclosed below to complete analytical determinations in accordance with regulatory requirements and instantaneously record and communicate analytical progress on a real-time basis from the analytical laboratory to customers.

Embodiments of the present invention preferably deploy and manage field work through a protocol comprising three distinct job categories, namely: 1) Field Samplers; 2) Sample Runners, and; 3) Sample Coordinators. The Sample Coordinator preferably directs and assigns the Field Samplers and Sample Runners. The method comprises placing field laboratories strategically on a daily basis to enhance time efficiency associated with travel between customer locations and the locations where analyses can be performed. Thus, the Field Samplers are preferably outer branches, a Fixed-Base Lab is the core of operations, and the Sample Runners are the connection between the outer branches and the core. This enables the organization to continually improve time-based performance without any impact on quality of the product.

In one embodiment, Field Samplers are preferably accredited Asbestos Site Inspectors. Preferably, they operate under the supervision of the Sample Coordinator (a Certified Asbestos Consultant). Preferably, they mobilize to sites, sample suspect areas and initiate COCs.

In one embodiment, Sample Runners preferably have good driving records, have a good understanding of local/regional traffic and highway systems, and can operate a digital navigation application. Preferably, they pick up samples, transport the samples to a mobile laboratory analytical location (or Fixed-Base location) and execute COC transfers.

In one embodiment, the Sample Coordinator is a CAC who can supervise and approve sampling locations for Field Samplers, as well as take samples and sign final asbestos reports. Preferably, the Sample Coordinator directs all field activities to maximize time efficiency and sampling/analysis volume.

Conventional laboratories operate with analysts making observations and writing their observations on a paper form that documents the optical characteristics required by EPA/600/R-93/116. The sheets usually contain handwritten entries that describe the physical morphology, optical properties, and judgments of the analyst, ending with the analyst's determination of: 1) whether or not asbestos is present; 2) if present, the mineral identity of the asbestos mineral(s) present, and; 3) the estimated quantity of the asbestos and other phases observed by the analyst. The analyst then reviews, signs and dates the bench sheet. The completed bench sheet is then sent for processing into a report for the customer. That process entails incorporating the bench sheet data into a draft report, which is sent to the analyst for a quality control review prior to release to the customer. Each time a data point is entered, there is the opportunity for a copying (or other entry) error. Plus there is a considerable amount of time spent producing, reviewing, finalizing, signing and mailing out a report.

Embodiments of the present invention comprise a system that has the analyst create a "bench sheet" by preferably using a laptop computer that is loaded with a software application embodiment. Preferably, the application produces a worksheet that identifies the analyst, and preferably provides the analyst with a labeled sample identifier, customer name, customer contact information, and site address generated from the COC and customer log-in. The application also preferably limits all changes/entries on the worksheet to the assigned analyst and preferably supplies the analyst with a series of pull-down menus that preferably provide all options for each determination the analysts must make in order to comply with the USEPA requirements. The pull-down menus are preferably sequenced in an order that mimics the process that is required by the analytical method being used (e.g., R93-116; NIOSH 7400; or SW-846 Lead). Any skipped or incorrectly entered input preferably triggers a message for correcting the analytical sheet. The analyst preferably reviews, accepts and digitally signs the analysis form and submits the form for archiving. Preferably, once submitted for archiving the analysis cannot be altered, only replaced by an entirely new datasheet identified as a correction.

When all analyses for a given job are complete, the "bench sheet" is preferably interfaced with a report template. Preferably, a report template software application creates the report template. The report template application preferably extracts the analytical data and inserts those data into assigned fields in the report template. The report is preferably then generated and sent to the customer.

Lead determinations are preferably accomplished using a Field Portable X-Ray Fluorescence (FPXRF) device. The device is commercially available and is preferably operated in the field in accordance with USEPA's methods as prescribed in SW-846 for Lead Analyses in Soils and Sediments. Preferably, similar data entry and reporting elements as described above are conducted for FPXRF analyses.

For significant and/or repeat customers, a protected site internet or intranet portal is preferably available for direct access by the customer. Access to the portal is preferably password protected. Analyses being conducted by embodiments of the present invention are preferably viewable on the customer's portal in real time. This affords the customers the ability to observe the progress of sampling and analyses of the project as it is being conducted at their facilities. Preferably, the portal also provides the customer a location where all past environmental data generated by embodiments of the present invention can be stored and accessed whenever the customer desires. Storage of the data is preferably considered "permanent."

Figure 4:
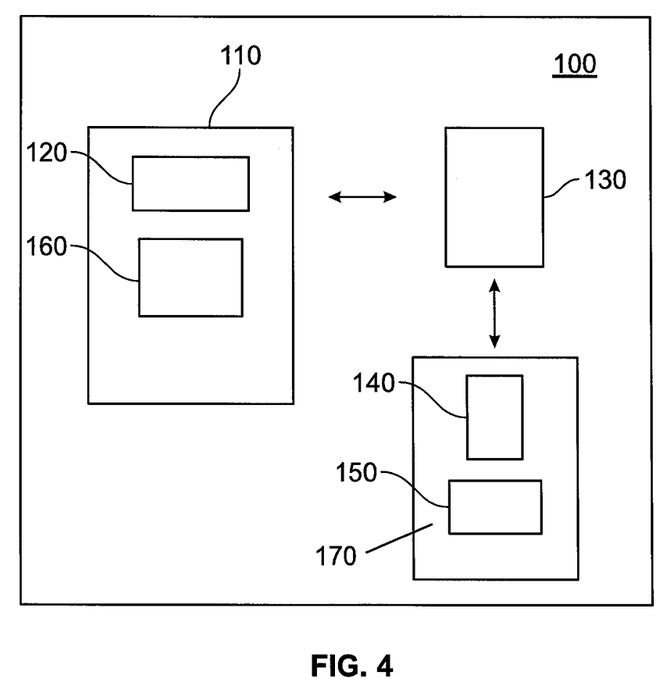
FIG. 4 shows an exemplary block diagram of a system capable of putting into practice a method for an electronic data input and processing of analytical results according to an embodiment of the present invention.

Embodiments of the present invention further comprise computerized system 100 comprising processor 130, which is configured to be operable to execute programs under control of program software provided in memory 140, and to perform functions in response to execution of those programs. In one embodiment, system 100 comprises Mobilab™ program software 150 for integrating the regulatory requirements for documenting observations with report preparation and delivery of results to the customer. In one embodiment, processor 130 comprises one or more central processing units or other processor units. The one or more central processing unit/s or other processor unit/s may be a single integrated circuit, such as a microprocessor, or one or more integrated circuits or circuitry configured to collectively perform functions of a central processing unit. Memory 140 comprises a random access memory (RAM) or other memory suitable for storing instructions for execution by processor 130, such as but not limited to DRAM, SRAM, flash memory, etc. Memory 140 may be a single type of memory or may be composed of many different components.

In one embodiment, system 100 comprises additional storage memory such as a disc or flash drive for storing instructions for processor execution. The memory and any additional storage memory are also available to processor 130 for temporary or permanent storage of results and data. In one embodiment, system 100 also comprises a network interface operably coupled to processor 130.

In one embodiment, system 100 further comprises user interface 110 comprising display 120 and one or more user input devices 160. Processor 130 is coupled to receive input from one or more user input devices 160 such as, but not limited to, a pointing device such as a mouse, pad or touch screen; and a text input device such as a keyboard or touch screen. Processor 130 also drives display 120, which in turn displays user interface images and may provide sounds, as controlled and provided by processor 130.

Processor 130 is organized and driven by operating system 170 that, together with the rest of the computer, runs Mobilab™ program software 150 when the program component is loaded into the processor from memory storing it. In one embodiment, operating system 170 is configured to support the Mobilab™ program software component. In another embodiment, operating system 170 has a modular configuration in which a graphics subsystem is separated from a kernel and operating system 170. In another embodiment, Mobilab™ program software 150 is implemented as part of an application program itself.

Operating system 170 running Mobilab™ program software component 150 permits access, when required, to allow interaction with integral devices such as the user input device, and with any data input and output sockets or network sites connected to system 100.

In a different embodiment, one or more aspects of system of 100 can be distributed among a plurality of different computers which collectively form system 100. Processor 130, memory and/or Mobilab™ program software component 150 can be split and disseminated in several parts of computers and network clouds.

Figure 5:
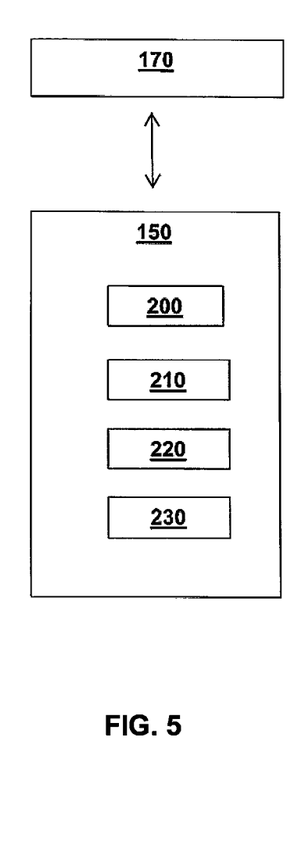
FIG. 5 shows a block diagram illustrating an embodiment of the program content of the processor of FIG. 4.

Referring now to FIG. 5, this shows a block diagram illustrating high-level Mobilab™ program software 150 content, which is loadable into processor 130 for execution. In one embodiment Mobilab™ program software 150 contains several components. It will be appreciated that these program components may be implemented as separate sub modules or one or more of the components implemented in a single module. As a general outline, in one embodiment, a user interface of the program includes log-in component 200 for accessing the program; input component 210 for documenting observations; report preparation component 220; and results delivery component 230.

INDUSTRIAL APPLICABILITY

The invention is further illustrated by the following non-limiting example.

Example 1

A trailer-type mobile laboratory was built with dimensions of approximately 8 feet wide by 7 feet high by 14 feet long. The mobile laboratory had running water, electricity, climate controls for heating and cooling, and communication capability. Three independent and redundant power sources were included: 1) battery, 2) gasoline/diesel generator, and 3) external source 110 volt plug-in. The mobile laboratory comprised a compartment for storage of the batteries, and an inverter for recharging the batteries. A generator was placed in a different compartment. The mobile laboratory was equipped with a sample receiving unit with a sample delivery airlock accessible through a delivery slot. All samples were received in a Ziploc bag prior to entry into the mobile laboratory. The Ziploc bag was placed in the slot into the airlock. The airlock was isolated from the inside of the mobile lab by a solid door that was locked with a key. Once the sample bag was in the airlock, an analyst inside activated a vacuum system that filtered air through a HEPA filter, thereby removing any surface contamination associated with the sample or the immediate environment outside the mobile laboratory. After five volumes of air were evacuated, the zipped sample bag was transferred immediately to a HEPA-filtered operating hood, where the samples were removed and mounted. The internal air of the mobile laboratory was cleaned twice daily by filtering the air through the HEPA filtered hoods. Since some samples required exposure to solvents or heat or both in order to observe asbestos fibers, the mobile laboratory was equipped with a high volume ceiling fan that was used for rapid ventilation, and operable windows to address issues with fumes, vapors, etc. The operating hoods in the mobile laboratory were an internally exhausted through a HEPA filtering system. The need for fresh air was accommodated by acquiring replacement air through a ventilator that contained HEPA filters for particles and carbon filters for organic vapors. The mobile laboratory had two independent work areas, each outfitted to inspect, prepare, mount and analyze samples. One of the stations was located in the front of the mobile laboratory and the other was in the rear end. Each station was outfitted with all the equipment necessary for creating and evaluating the mounted sample slides required by USEPA for asbestos mineral detection and airborne fiber counting. All microscope analyses of asbestos samples were conducted with a microscope in the hood. The mobile laboratory was further equipped with continuously adjustable hydraulic stabilizers. The stabilizers were located strategically on the undercarriage of the mobile laboratory to maintain the microscopes stable. Results were reported to the customer in between approximately 0.5 hrs. and approximately 4.0 hrs.

The preceding example can be repeated with similar success by substituting the generically or specifically described components and/or operating parameters of this invention for those used in the preceding examples.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

What is claimed is:

1. A mobile laboratory that provides real-time study results onsite comprising:
 a mobile facility;
 a sample receiving unit comprising a sample delivery airlock for receiving samples from onsite into said mobile facility;
 power;

one or more working stations outfitted with at least one microscope necessary for detecting and quantifying asbestos or mold contamination and at least one computer for reporting the asbestos or mold contamination onsite at said mobile laboratory;

ventilation; and a filter to provide fresh air inside said mobile laboratory.

2. The mobile laboratory of claim 1 wherein said equipment comprises one or more HEPA-filtered operating hoods.

3. The mobile laboratory of claim 1 wherein one or more hoods are internally exhausted through a HEPA filtering system.

4. The mobile laboratory of claim 1 wherein the interior of said sample delivery airlock is accessible through a delivery slot on the outside of said mobile facility.

5. The mobile laboratory of claim 4 wherein said delivery airlock comprises a vacuum system that filters air through a HEPA filter, thereby removing any surface contamination associated with a sample.

6. The mobile laboratory of claim 1 further comprising operating windows.

7. The mobile laboratory of claim 1 wherein said power is provided by a system selected from the group consisting of an AC land-line source connected via an extension cord, battery power, a fossil fuel generator, and a solar power station that converts solar energy to electricity.

8. The mobile laboratory of claim 1 further comprising undercarriage continuously adjustable hydraulic stabilizers according to the physical dimension of said mobile laboratory.

9. The mobile laboratory of claim 1 further comprising a computerized system comprising one or more computers.

10. The mobile laboratory of claim 9 wherein said computerized system further comprises software for integrating the regulatory requirements for documenting observations with report preparation.

11. The mobile laboratory of claim 10 wherein said software further integrates delivery of results to the customer.

12. A method of expediting the reporting of analytical test results and documenting the receiving and processing of samples on site at the mobile laboratory of claim 1.

13. The method of claim 12 further comprising creating a digital bench sheet for directly generating a results report.

14. The method of claim 13 wherein said results report is provided to a customer in between approximately 1 hrs. and approximately 10 hrs.

15. The method of claim 14 wherein said results report is provided to a customer in between approximately 0.75 hrs. and approximately 6 hrs.

16. The method of claim 15 wherein said results report is provided to a customer in between approximately 0.2 hrs. and approximately 4.5 hrs.

* * * * *

UNITED STATES PATENT AND TRADEMARK OFFICE
CERTIFICATE OF CORRECTION

PATENT NO. : 9,623,782 B1  
APPLICATION NO. : 14/709265  
DATED : April 18, 2017  
INVENTOR(S) : William Coons Page 1 of 1

It is certified that error appears in the above-identified patent and that said Letters Patent is hereby corrected as shown below:

On the Title Page

Item (73) Assignee currently reads:  
Mobile Environmental Determinations, USA, L.L.C., San Diego, CA (US)  
Should be corrected so it reads:  
Mobilab Environmental Determinations, USA, L.L.C., San Diego, CA (US)

Signed and Sealed this  
Thirtieth Day of June, 2020

Andrei Iancu  
*Director of the United States Patent and Trademark Office*